US011108655B2

(12) United States Patent
Gangadhar et al.

(10) Patent No.: US 11,108,655 B2
(45) Date of Patent: Aug. 31, 2021

(54) AUTOMATED APPLICATION DEPLOYMENT IN A MANAGED SERVICES DOMAIN

(71) Applicant: International Business Machines Corporation, Armonk, NY (US)

(72) Inventors: Jayanth Gangadhar, Bangalore (IN); Karthick Ramanujam, Chennai (IN); Ullas M. Basavaraj, Bangalore (IN); Ankur B. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/029,502

(22) Filed: Jul. 6, 2018

(65) Prior Publication Data

US 2020/0014607 A1    Jan. 9, 2020

(51) Int. Cl.
*G06F 15/16*    (2006.01)
*H04L 12/24*    (2006.01)
*H04L 29/08*    (2006.01)

(52) U.S. Cl.
CPC .......... *H04L 41/5054* (2013.01); *H04L 41/16* (2013.01); *H04L 67/10* (2013.01)

(58) Field of Classification Search
CPC .................................................. H04L 41/5054
See application file for complete search history.

(56) References Cited

U.S. PATENT DOCUMENTS

| 8,943,493 B2 | 1/2015 | Schneider |
| 8,997,088 B2 | 3/2015 | Gurikar et al. |
| 9,519,472 B2 | 12/2016 | McLeod et al. |
| 9,747,090 B2 | 8/2017 | Chen et al. |
| 2013/0132950 A1* | 5/2013 | McLeod ............. G06F 9/45558 718/1 |

(Continued)

OTHER PUBLICATIONS

Mell, Peter et al. The NIST Definition of Cloud Computing. National Institute of Standards and Technology, U.S Department of Commerce, NIST Special Publication 800-145, Sep. 2011, 7 pages.

*Primary Examiner* — Kevin T Bates
*Assistant Examiner* — Clarence D McCray
(74) *Attorney, Agent, or Firm* — The Steadman Law Firm PLLC

(57) ABSTRACT

Techniques are described relating to automated deployment of an application in a managed services domain of a cloud computing environment. One or more of such techniques may minimize human interaction or intervention during deployment of the application. An associated method includes receiving from a client system a request to deploy the application in a target environment and analyzing the request via a machine learning knowledge model. Additionally, the method includes requesting from the client system access to the target environment and, upon receiving access to the target environment, validating the target environment through inspection. Upon validating the target environment, the method further includes facilitating presentation of an application deployment plan through an interface of the client system. Responsive to client approval of the application deployment plan, the method further includes deploying the application by facilitating application installation in the target environment via the machine learning knowledge model.

20 Claims, 11 Drawing Sheets

(56) References Cited

U.S. PATENT DOCUMENTS

| | | | |
|---|---|---|---|
| 2014/0130036 A1* | 5/2014 | Gurikar | G06F 8/61 |
| | | | 717/176 |
| 2015/0106512 A1* | 4/2015 | Cama | H04L 43/08 |
| | | | 709/224 |
| 2016/0092787 A1 | 3/2016 | Gadde et al. | |
| 2017/0134242 A1 | 5/2017 | Ridl | |
| 2017/0353991 A1 | 12/2017 | Tapia | |
| 2017/0372411 A1 | 12/2017 | Kolegraff | |
| 2018/0255122 A1* | 9/2018 | Hu | G06F 11/3006 |

\* cited by examiner

AUTOMATED APPLICATION DEPLOYMENT IN A MANAGED SERVICES DOMAIN

BACKGROUND

The various embodiments described herein generally relate to automated application deployment in a managed services domain. More specifically, the various embodiments describe techniques of deploying an application among a plurality of applications in a managed services domain of a cloud computing environment.

Conventional manual application deployment requires substantial expenditure of time and effort on the part of various subject matter experts for purposes of environment configuration and product installation. Additionally, manual application deployment in a conventional context may require extensive administrative knowledge and maintenance and furthermore may increase potential for client error.

SUMMARY

The various embodiments described herein provide techniques of automated application deployment. According to an embodiment, an associated method includes receiving from a client system a request to deploy the application in a target environment. The request includes application configuration details. Furthermore, the method includes analyzing the request via a machine learning knowledge model. The machine learning knowledge model determines installation prerequisites or dependent components based upon the application configuration details. Additionally, the method includes requesting from the client system access to the target environment and, upon receiving access to the target environment, validating the target environment through inspection. Upon validating the target environment, the method further includes facilitating presentation of an application deployment plan through an interface of the client system. In an embodiment, the method further includes, responsive to client approval of the application deployment plan, deploying the application by facilitating application installation in the target environment via the machine learning knowledge model. In an alternative embodiment, the method further includes, responsive to client disapproval of the application deployment plan, receiving from the client system at least one proposed alternative.

Optionally, the method further includes addressing at least one issue pertaining to the application installation. In an embodiment, the step of addressing the at least one issue pertaining to the application installation includes applying artificial intelligence techniques of the machine learning knowledge model to seek a resolution to the at least one issue. Furthermore, the step of addressing the at least one issue pertaining to the application installation includes, responsive to failing to determine a resolution to the at least one issue through application of the artificial intelligence techniques, receiving from domain administration a manual override of the application installation to address the at least one issue, wherein the manual override includes feedback. According to such embodiment, the step of addressing the at least one issue pertaining to the application installation further includes submitting the feedback to at least one subject matter expert among a plurality of subject matter experts in the managed services domain for validation and, upon receiving validation of the feedback, adapting a knowledge base of the machine learning knowledge model based upon the feedback.

In a further embodiment, the step of validating the target environment includes, responsive to determining that specifications of the target environment do not meet minimum requirements for deployment of the application, notifying the client system of at least one upgrade necessary to meet the minimum requirements. According to such embodiment, the step of validating the target environment further includes, responsive to determining that at least one dependent component required for deployment of the application is missing from the target environment, notifying the client system of the necessity of the at least one dependent component.

Configuring a knowledge base of the machine learning knowledge model includes initializing the knowledge base based upon expert input. In an embodiment, the step of initializing the knowledge base includes incorporating respective base models of the plurality of applications into the knowledge base and incorporating performance tuning parameters based upon compatibility between respective operating systems and respective aspects of the plurality of applications. Configuring the knowledge base further includes extending the knowledge base consequent to at least one update within the managed services domain. In a further embodiment, the at least one update is selected from the group consisting of a system upgrade, an application integration, and an application fix.

An additional embodiment includes a computer program product including a computer readable storage medium having program instructions embodied therewith. According to such embodiment, the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
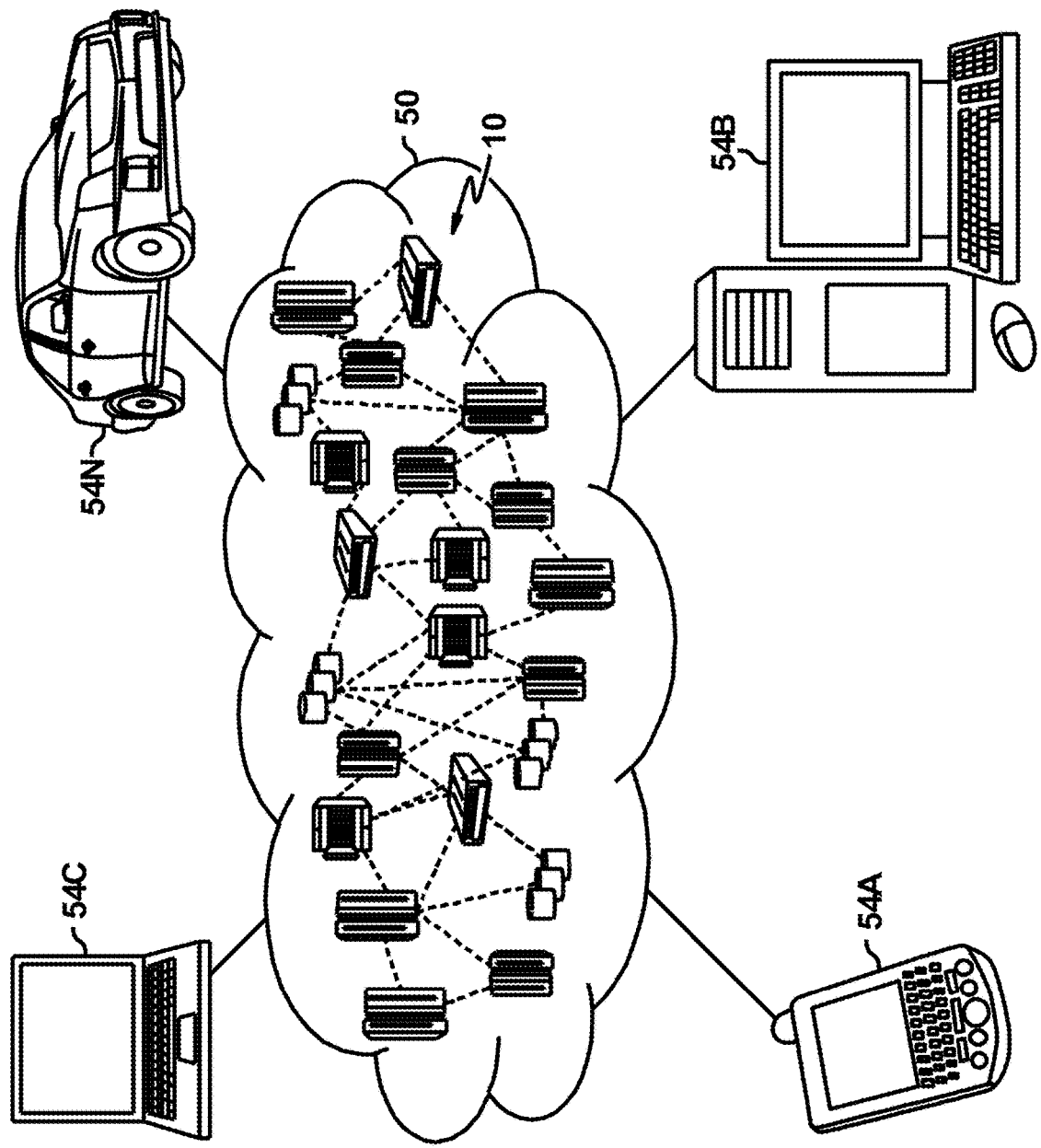
FIG. 1 depicts a cloud computing environment, according to one or more embodiments.

The various embodiments described herein are directed to techniques of automated application deployment in a managed services domain of a cloud computing environment, e.g., a virtualized environment in which one or more computing capabilities are available as a service. A cloud server system configured to implement automated application deployment techniques associated with the various embodiments described herein may utilize artificial intelligence capabilities of a machine learning knowledge model as well as information of a knowledge base associated with the model.

The various embodiments described herein may have advantages over conventional techniques. Specifically, since an automated application deployment plan in accordance with the various embodiments may be determined by a machine learning knowledge model capable of applying artificial intelligence by utilizing aspects of a knowledge base, the various embodiments may improve functioning of computer server(s) in a managed services domain of a hybrid cloud computing environment by minimizing the presence of human interaction and/or the necessity of human intervention in application deployment. The machine learning knowledge model may learn based upon activities resulting from each deployment iteration, e.g., encountered deployment issue(s) and feedback provided to address such issue(s). In accordance with the various embodiments, client activity may be minimized to approval of the application deployment plan and provision of feedback in the event that an issue arises consequent to application installation or another aspect of deployment. However, a client as well as subject matter experts may be able to provide input to a knowledge base of the machine learning knowledge model. Furthermore, the automated deployment techniques according to the various embodiments may be utilized for on-premise client systems, contingent upon connectivity to a hybrid cloud computing environment. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to automated application deployment in a managed services domain. However, it is to be understood that the techniques described herein may be adapted to a variety of purposes in addition to those specifically described herein. Accordingly, references to specific embodiments are included to be illustrative and not limiting.

The various embodiments described herein may be provided to end users through a cloud computing infrastructure. It is to be understood that although this disclosure includes a detailed description on cloud computing, implementation of the teachings recited herein are not limited to a cloud computing environment. Rather, the various embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Thus, cloud computing allows a user to access virtual computing resources (e.g., storage, data, applications, and even complete virtualized computing systems) in the cloud, without regard for the underlying physical systems (or locations of those systems) used to provide the computing resources. This cloud model may include at least five characteristics, at least three service models, and at least four deployment models.

Characteristics are as follows:

On-demand self-service: A cloud consumer can unilaterally provision computing capabilities, such as server time and network storage, as needed automatically without requiring human interaction with the provider of the service.

Broad network access: Capabilities are available over a network and accessed through standard mechanisms that promote use by heterogeneous thin or thick client platforms (e.g., mobile phones, laptops, and personal digital assistants (PDAs)).

Resource pooling: The computing resources of the provider are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): The capability provided to the consumer is to use the applications of the provider running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 illustrates a cloud computing environment 50, according to an embodiment. As shown, cloud computing environment 50 may include one or more cloud computing nodes 10 with which local computing devices used by cloud consumers, such as, for example, PDA or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. Accordingly, cloud computing environment 50 may offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
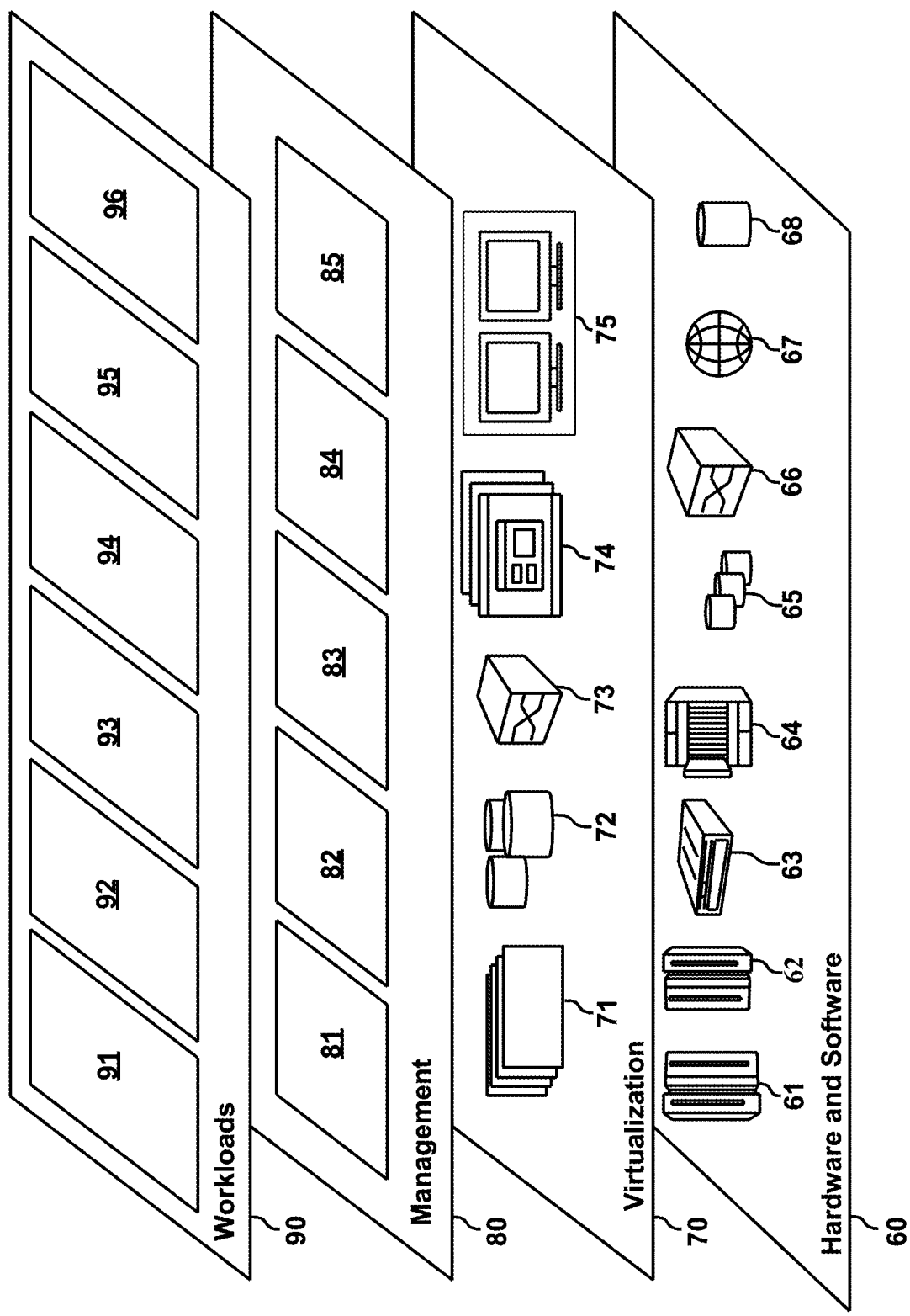
FIG. 2 depicts abstraction model layers provided by a cloud computing environment, according to one or more embodiments.

FIG. 2 illustrates a set of functional abstraction layers provided by cloud computing environment 50, according to an embodiment. It should be understood in advance that the components, layers, and functions shown in FIG. 2 are intended to be illustrative only; embodiments of the invention are not limited thereto. As depicted, various layers and corresponding functions are provided. Specifically, hardware and software layer 60 includes hardware and software components. Examples of hardware components may include mainframes 61, RISC (Reduced Instruction Set Computer) architecture based servers 62, servers 63, blade servers 64, storage devices 65, and networks and networking components 66. In some embodiments, software components may include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that are utilized to perform tasks within cloud computing environment 50. Metering and pricing 82 may provide cost tracking as resources are utilized within cloud computing environment 50, and billing or invoicing for consumption of these resources. In one example, these resources may include application software licenses. Security provides identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with a SLA.

Workloads layer 90 provides examples of functionality for which cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and application deployment 96. Application deployment 96 may enable automated deployment techniques via a machine learning knowledge model in accordance with the various embodiments described herein.

Figure 3:
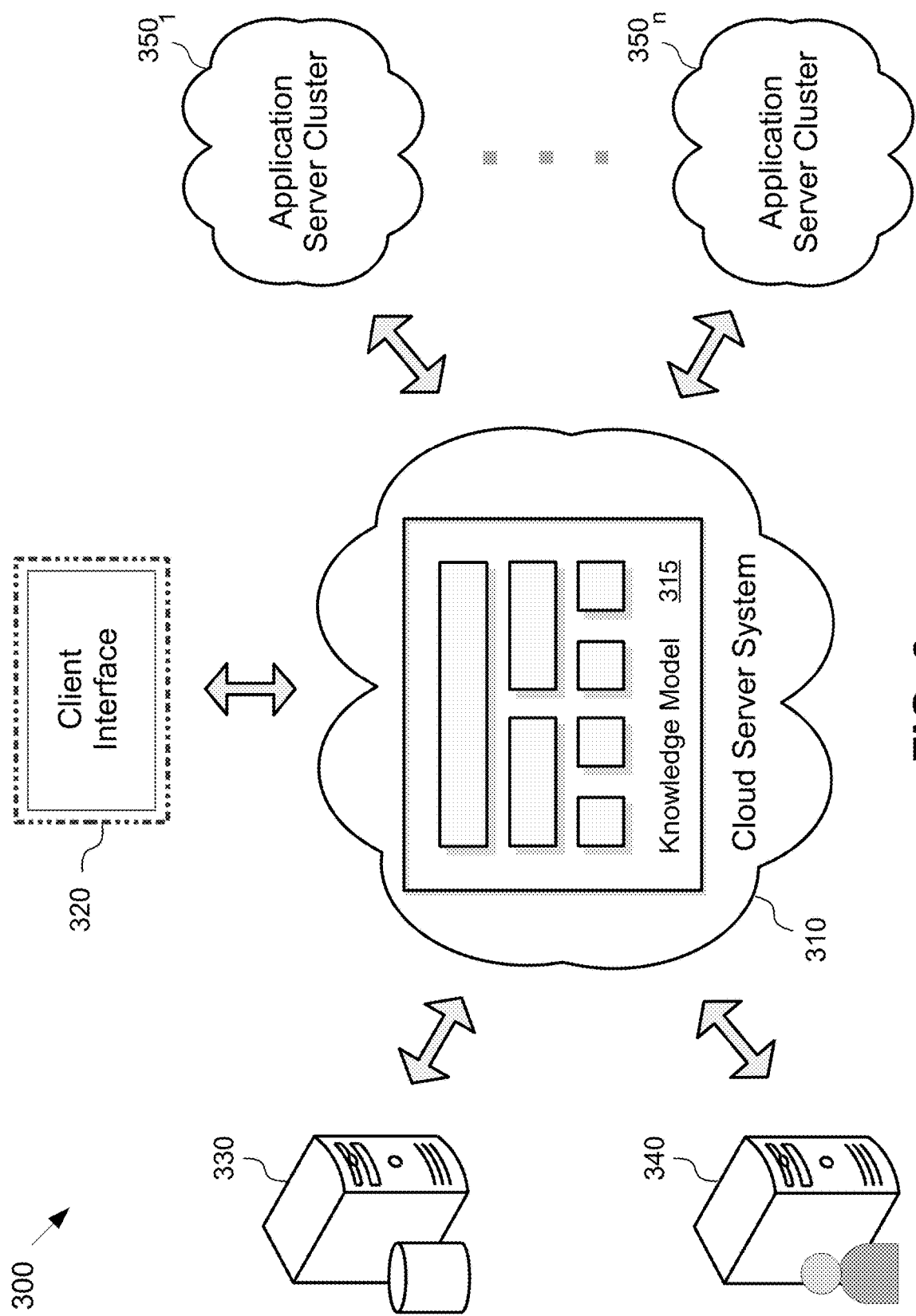
FIG. 3 depicts a managed services domain in a cloud computing environment, according to one or more embodiments.

FIG. 3 illustrates a managed services domain 300 within cloud computing environment 50. Managed services domain 300 includes cloud server system 310. In an embodiment, cloud server system 310 includes a machine learning knowledge model 315, which may be capable of enabling and/or facilitating automated deployment techniques in accordance with the various embodiments described herein. Furthermore, in an embodiment, managed services domain 300 includes one or more of a client interface 320, a database system 330, a directory server system 340, and a plurality of application server clusters $350_1$ to $350_n$. Client interface 320 enables communication between cloud server system 310 and one or more client systems that interact with managed services domain 300. Moreover, in an embodiment, cloud server system 310 is configured to communicate with database system 330, directory server system 340, and/or application server clusters $350_1$ to $350_n$. Additionally, application servers within application server clusters $350_1$ to $350_n$ may be configured to communicate with one another.

Database system 330 may coordinate and manage a knowledge base of the machine learning knowledge model 315. Database system 330 may include one or more database servers, which may coordinate and/or manage various aspects of the knowledge base. Database system 330 stores relationships between the plurality of application server clusters $350_1$ to $350_n$ and the knowledge base. In an embodiment, database system 330 is managed via a database management system (DBMS). In a further embodiment, database system 330 includes one or multiple databases, some or all of which may be relational databases. In a further embodiment, database system 330 includes one or more ontology trees or other ontological structures. Directory server system 340 facilitates client authentication in managed services domain 300, including client authentication with respect to one or more of application server clusters $350_1$ to $350_n$. For purposes of authentication with respect to one or more of a plurality of applications in managed services domain 300, a client may provide environment details and credentials relevant to such application(s). Application server clusters $350_1$ to $350_n$ store aspects of various applications as well as provide managed server services to one or more client systems.

Figure 4:
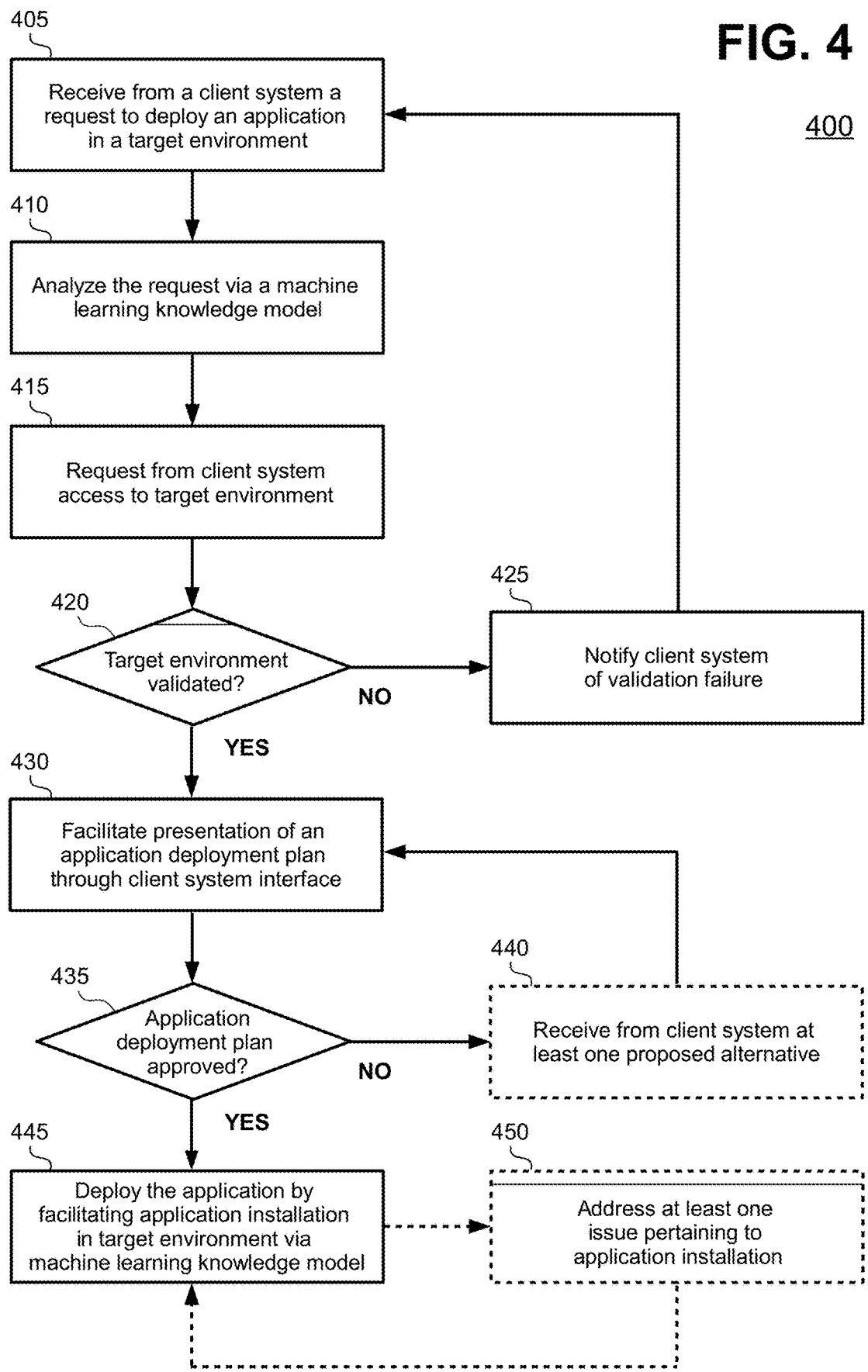
FIG. 4 illustrates a method of automated deployment of an application among a plurality of applications in a managed services domain, according to one or more embodiments.

FIG. 4 illustrates an automated application deployment method 400. In an embodiment, one or more steps associated with the method 400 are carried out in an environment in which computing capabilities are provided as a service (e.g., cloud computing environment 50). According to such embodiment, one or more steps associated with the method 400 are carried out in a managed services domain within a cloud computing environment (e.g., managed services domain 300). The cloud computing environment may be a hybrid cloud environment. In a further embodiment, one or more steps associated with the method 400 are carried out in one or more other environments, such as a client-server network environment or a peer-to-peer network environment. A centralized cloud server system in a managed services domain (e.g., cloud server system 310 in managed services domain 300) may facilitate processing according to the method 400 and the other methods further described herein. The automated deployment techniques facilitated or otherwise carried out via the cloud server system in the managed services domain may be associated with application deployment within a workloads layer among functional abstraction layers provided by the environment (e.g., application deployment 96 within workloads layer 90 of cloud computing infrastructure 50).

In an embodiment, the method 400 begins at step 405, where the cloud server system receives from a client system a request to deploy an application in a target environment. In the context of the various embodiments described herein, the client system is associated with a single user/entity or a group of users/entities. According to such embodiment, the target environment includes one or more managed servers allocated for the client within the managed services domain. Furthermore, according to such embodiment, the one or more managed servers may be located within one or more application server clusters of the managed services domain (e.g., application server clusters $350_1$ to $350_n$). Additionally or alternatively, the one or more managed servers may include one or more database servers within a database system of the managed services domain (e.g., database system 330). The application referenced in the request may be an application among a plurality of applications associated with the managed services domain. In an embodiment, the plurality of applications are stored and processed by the application server clusters of the managed services domain. In a further embodiment, the request includes application configuration details. The application configuration details encompass details of a product suite associated with the application, including a product version number, an operating system of the managed server, requested capabilities of the application, and/or desired deployment architecture. A product suite in the context of the various embodiments described herein is a product or a group of products that constitute the application or are otherwise related to the application. A group of products in a product suite may be sold together or otherwise processed together. The cloud server system receives the request in accordance with step 405 via a client interface in the managed services domain (e.g., client interface 320).

At step 410, the cloud server system analyzes the deployment request via a machine learning knowledge model (e.g., machine learning knowledge model 315). Specifically, in an embodiment, the cloud server system analyzes the request by applying artificial intelligence based decision making and learning capabilities of the machine learning knowledge model. According to such embodiment, the machine learning knowledge model determines installation prerequisites and/or dependent components based upon the application configuration details. The machine learning knowledge model is self-learning and accepts input from various spheres, including implementation feedback, client and/or administrative feedback, release notes of software, compatibility matrices, and/or system requirements. Optionally, at step 410 the cloud server system further submits the determined installation prerequisites and/or dependent components to the client system, e.g., via the client interface in the managed services domain. Accordingly, in an embodiment, responsive to unanticipated installation prerequisites and/or dependent components, the client system may apply or may facilitate application of any necessary preliminary update to the target environment. A preliminary update according to this embodiment is defined as an update applied prior to inspection of the target environment by the cloud server system, as further described herein in the context of step 420.

In a further embodiment, the machine learning knowledge model employs one or more heuristics to determine installation prerequisites and/or dependent components upon analyzing the deployment request according to step 410. In the context of this embodiment and other embodiments described herein, a heuristic is a machine logic based rule that provides a determination based upon one or more predetermined types of input. Predetermined types of input to various heuristics in the context of analyzing the deployment request may include installation prerequisites and/or dependent components of recently encountered deployment request(s). Accordingly, in one example, a heuristic may handle analysis of the deployment request by determining installation prerequisites and/or dependent components of a most recently encountered deployment request and consequently determining corresponding (e.g., identical or otherwise analogous) installation prerequisites and/or dependent components appropriate for the deployment request. Additionally or alternatively, predetermined types of input to various heuristics in the context of analyzing the deployment request may include installation prerequisites and/or dependent components of previously encountered deployment requests(s) that are most similar to the deployment request. Measuring relative similarity between the deployment request and previously encountered deployment request(s) may entail determining a quantitative degree of similarity between the deployment request and previously encountered deployment request(s). Accordingly, in another example, a heuristic may handle analysis of the deployment request by determining installation prerequisites and/or dependent components of a previously encountered deployment request having a highest degree of similarity to the deployment request and consequently determining corresponding (e.g., identical or otherwise analogous) installation prerequisites and/or dependent components appropriate for the deployment request.

At step 415, the cloud server system requests from the client system access to the target environment. The request from the cloud server system to the client system according to step 415 includes a request for any authentication credentials and/or location information necessary to access the target environment. The cloud server system optionally transmits the request to the client system via the client interface in the managed services domain. At step 420, upon receiving access to the target environment, the cloud server system validates the target environment through inspection. For instance, the cloud server system performs an inspection of the target environment in order to confirm that target environment specifications and dependent components are sufficient for deployment of the application. Responsive to rejecting validation of the target environment, i.e., upon determining that the target environment cannot be validated, at step 425 the cloud server system notifies the client system of the validation failure and returns to step 405 to await a new or modified request from the client system. Optionally, responsive to rejecting validation of the target environment, at step 425 the cloud server system further may identify one or more validation issues and may suggest one or more measures to remediate the one or more validation issues. Upon receiving notification of the validation failure from the cloud server system, the client system optionally may apply or may facilitate application of any necessary update to the target environment in accordance with the suggested one or more measures. Responsive to validating the target environment, the cloud server system proceeds to step 430. An embodiment with regard to validating the target environment through inspection according to step 420 is described with respect to FIG. 5.

Figure 9A:
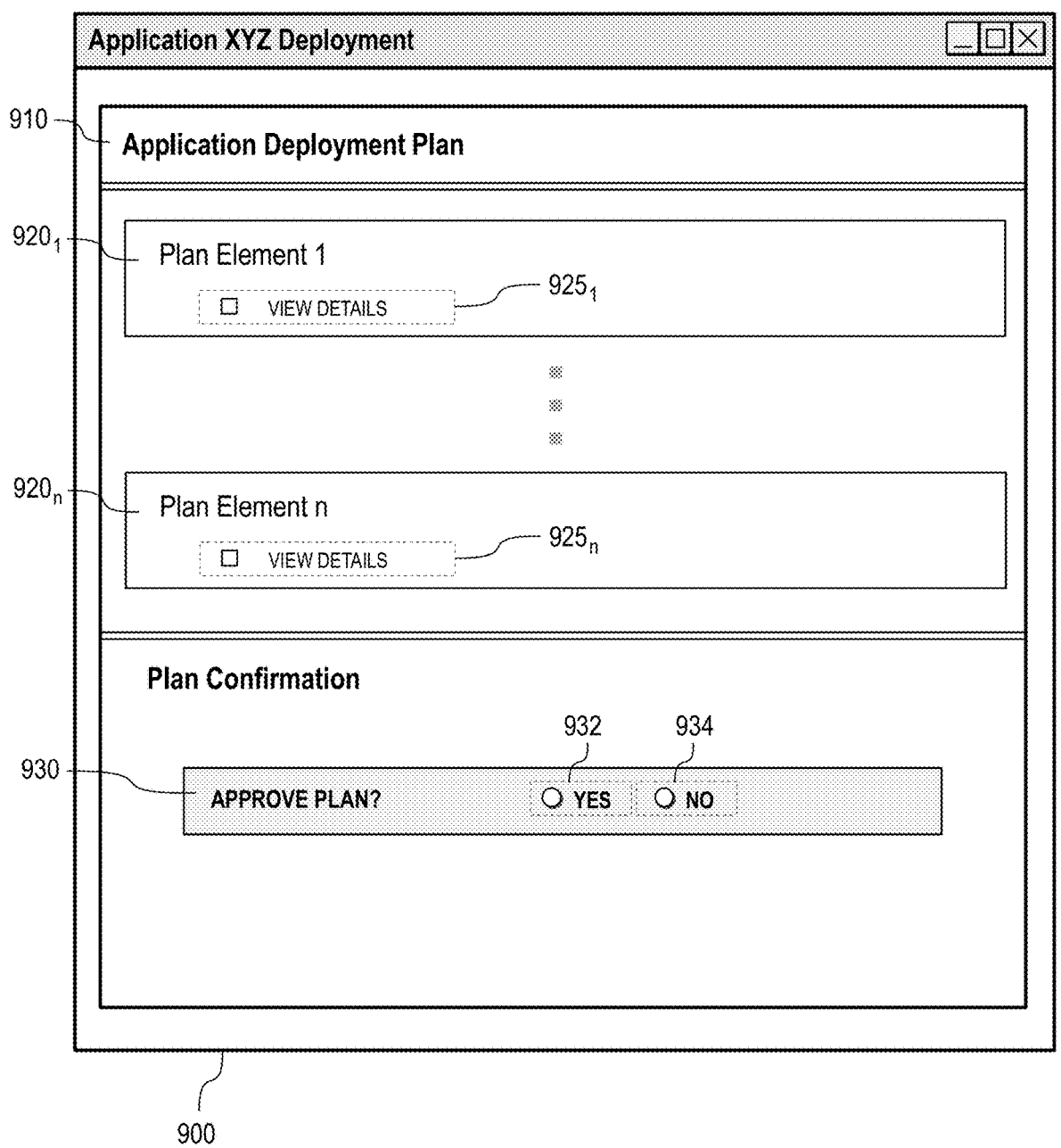
FIGS. 9A and 9B illustrate an interface of a client system in an example scenario involving presentation of an application deployment plan.
Figure 9B:
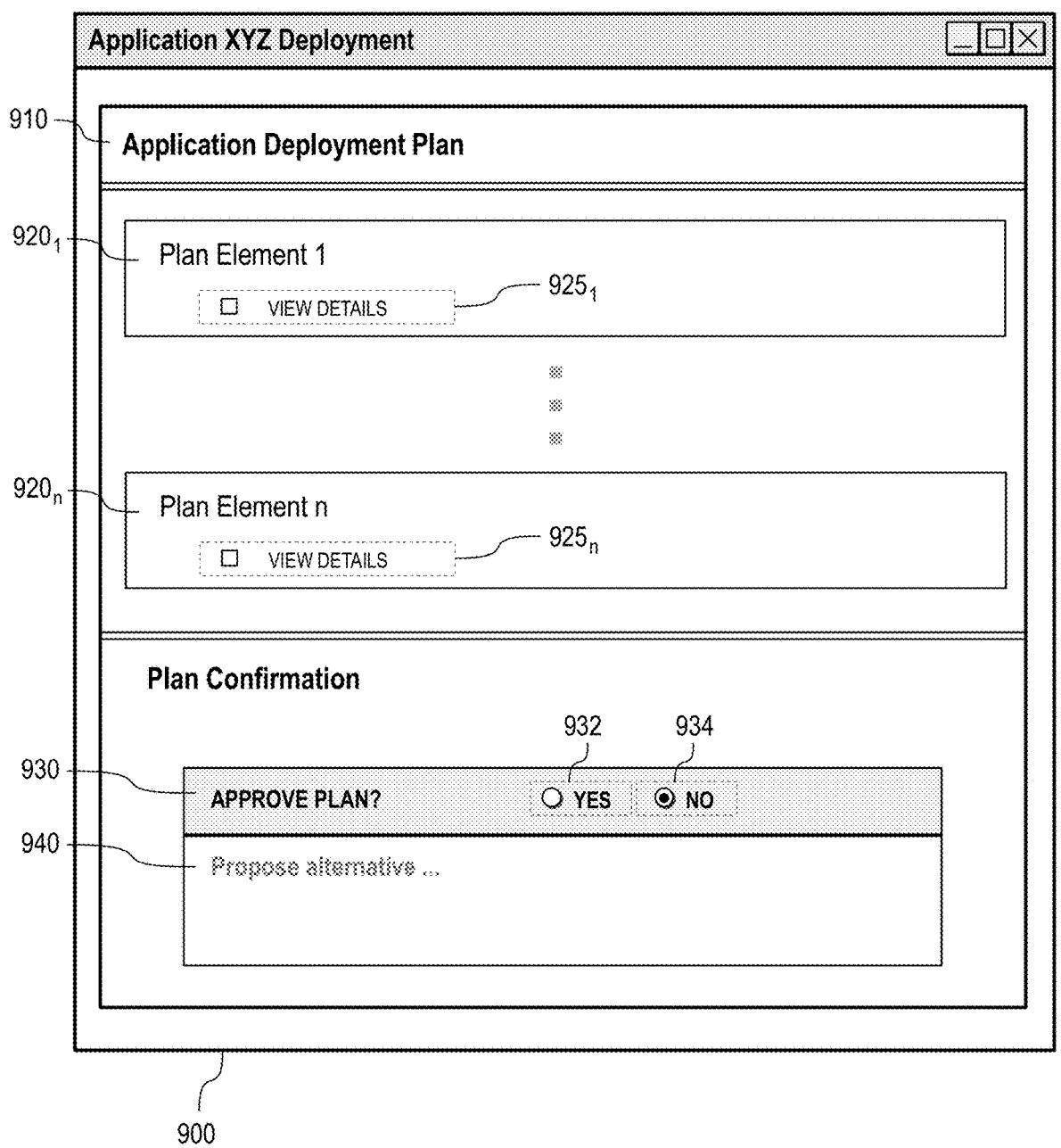

At step 430, the cloud server system facilitates presentation of an application deployment plan through an interface of the client system. In an embodiment, the cloud server system may prepare the deployment plan based upon architectural and strategic guidelines for the application or aspects of a product suite associated with the application. According to such embodiment, the cloud server system applies artificial intelligence based decision making and learning capabilities of the machine learning knowledge model to such application guidelines or product suite aspects to determine one or more elements of the deployment plan. In another embodiment, the interface of the client system is a user interface in the form of a graphical user interface (GUI) and/or a command line interface presented via a client application installed on or otherwise accessible to the client system. In a further embodiment, the cloud server system may present the application deployment plan in the interface of the client system by transmitting the application deployment plan to and otherwise communicating with the client application via the client interface in the managed services domain. For example, by communicating with the client application, the cloud server system may facilitate display of text or audiovisual imagery associated with the application deployment plan via one or more interface elements of the interface of the client system. FIGS. 9A-9B, further described herein, depict an interface of a client system in an example scenario involving presentation of an application deployment plan.

In an embodiment, the application deployment plan presented according to step 430 includes multiple steps and optionally pertains to multiple managed servers in the target environment. For example, a first step in the application deployment plan may include stopping an application server in the target environment. A second step in the application deployment plan may include updating a patch associated with a database server in the target environment. Such second step may include the following sub-steps: backing up the database(s) associated with the database server, stopping the database server, updating the patch, and restarting the database server. A third step may include restarting the application server.

At step 435, the cloud server system determines whether the client approves the application deployment plan. In an embodiment, as depicted in the example scenario illustrated in FIGS. 9A and 9B and further described herein, the cloud server system may determine whether the client approves the application deployment plan by facilitating display of one or more client-selectable elements respectively corresponding to an approval option and a disapproval option within the interface of the client system. According to such embodiment, upon determining that the client selects a client-selectable element in the interface corresponding to the approval option, the cloud server system determines that the client approves the application deployment plan. Conversely, upon determining that the client selects a client-selectable element in the interface corresponding to the disapproval option, the cloud server system determines that the client disapproves the application deployment plan.

In an embodiment, responsive to client disapproval of the application deployment plan at step 435, optionally at step 440 the cloud server system receives from the client system at least one proposed alternative, and the cloud server system returns to step 430, where the cloud server system once again presents the application deployment plan in modified form. According to such embodiment, as illustrated in FIG. 9B and further described herein, the cloud server system may facilitate display within the interface of the client system of a text box and/or other element through which at least one proposed alternative may be submitted by the client. Specifically, the at least one proposed alternative may be an alternative deployment plan or at least one proposed modification to the application deployment plan. Optionally, the at least one proposed alternative is added to the knowledge base of the machine learning knowledge model. In a further embodiment, the at least one proposed alternative is incorporated into the modified application deployment plan upon verification of viability by the cloud server system. The cloud server system may verify the viability of the at least one proposed alternative by confirming that the at least one proposed alternative satisfies all relevant deployment requirements, e.g., in terms of application installation.

In a further embodiment, responsive to client approval of the application deployment plan at step 435, the cloud server system proceeds to step 445, where the cloud server system deploys the application by facilitating application installation in the target environment via the machine learning knowledge model. The cloud server system deploys the application by applying artificial intelligence based decision making and learning capabilities of the machine learning knowledge model. According to the embodiment, the machine learning knowledge model employs one or more heuristics to make a determination with respect to a newly encountered issue in the context of automated application deployment according to step 445. One predetermined type of input to various heuristic deployment rules may include dispositions(s) of recently encountered issues(s). Accordingly, in one example, a heuristic may handle an ambiguous deployment scenario for a newly encountered issue by selecting a deployment action identical or otherwise analogous to a deployment action taken in connection with a most recently encountered issue. Another predetermined type of input may include dispositions(s) of previously encountered issue(s) that are most similar to a newly encountered issue in an application deployment context. Measuring relative similarity between a newly encountered issue and previously encountered issue(s) may entail determining a quantitative degree of similarity between such newly encountered issue and previously encountered issue(s). Accordingly, in another example, a heuristic may handle an ambiguous deployment scenario for a newly encountered issue by selecting a deployment action identical or otherwise analogous to a deployment action taken in connection with a previously encountered issue having a highest degree of similarity to such newly encountered issue. In a further embodiment, the cloud server system applies one or more artificial intelligence algorithms for automated application deployment according to step 445.

Figure 10:
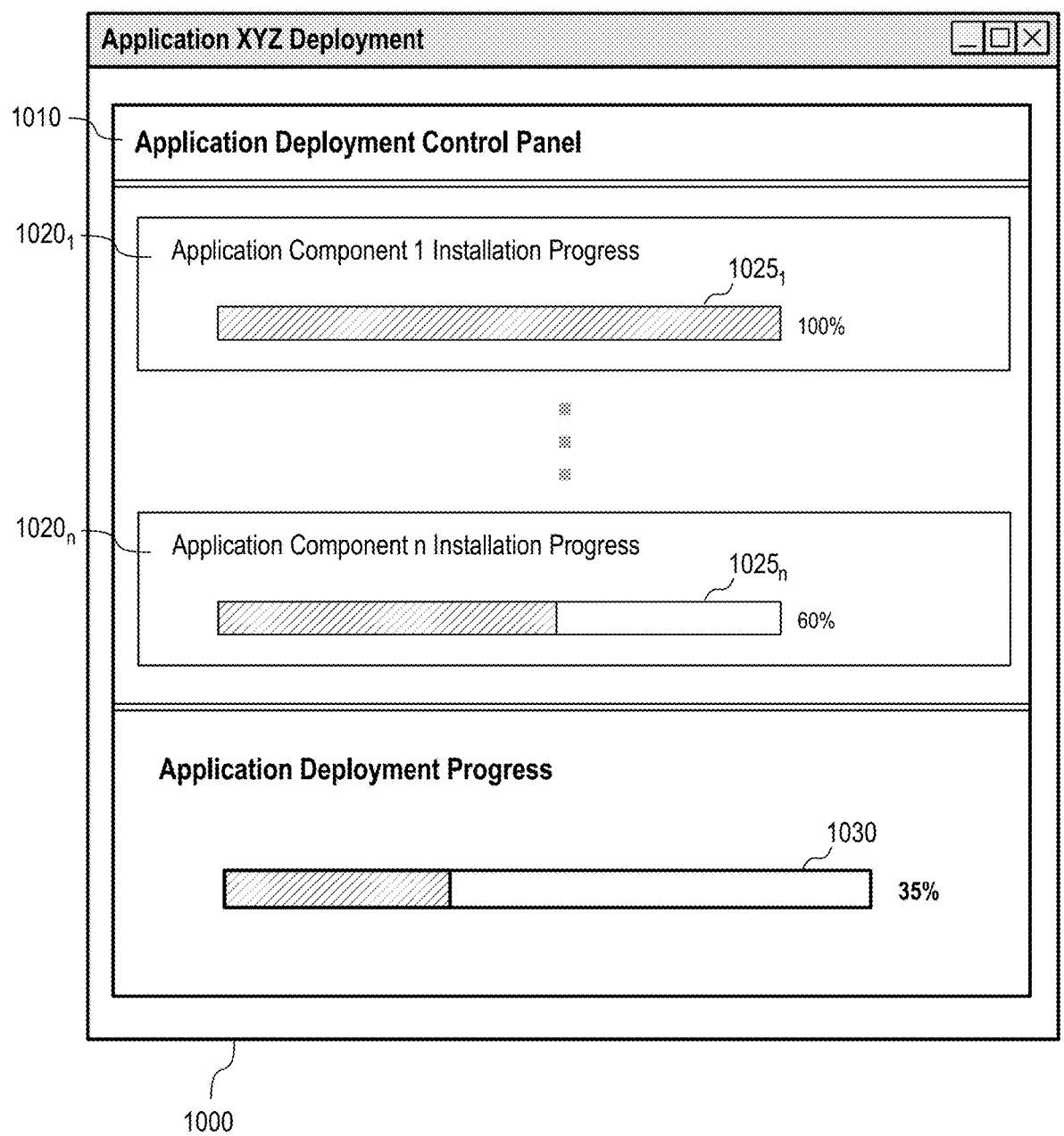
FIG. 10 illustrates an interface of a client system in an example scenario involving display of progress indictors with respect to application installation during application deployment.

The cloud server system may access one or more aspects of the application required for application installation from one or more application server clusters in the managed services domain. Optionally, during application deployment, the cloud server system facilitates display in the interface of the client system progress indicators with respect to the application installation, e.g., within a GUI-based system control panel. The progress indicators may include installation progress percentage(s), identity/type/size of components currently being installed, etc. FIG. 10, further described herein, depicts an interface of a client system in an example scenario involving display of progress indictors with respect to application installation during application deployment.

Optionally, at step 450 the cloud server system addresses at least one issue pertaining to the application installation. The at least one issue pertaining to the application installation may occur during deployment and/or subsequent to deployment. In an embodiment, the at least one issue involves one or more deficiencies. Examples of deficiencies to be addressed include an installation issue not previously encountered and/or an installation issue for which information is sparse or unavailable in the context of the machine learning knowledge model. An embodiment with regard to addressing at least one issue pertaining to the application installation according to step 450 is described with respect to FIG. 6. Optionally, the cloud server system returns to step 445 upon addressing the at least one issue, e.g., in the event that the at least one issue occurs during deployment, in which case deployment subsequently may resume.

Figure 5:
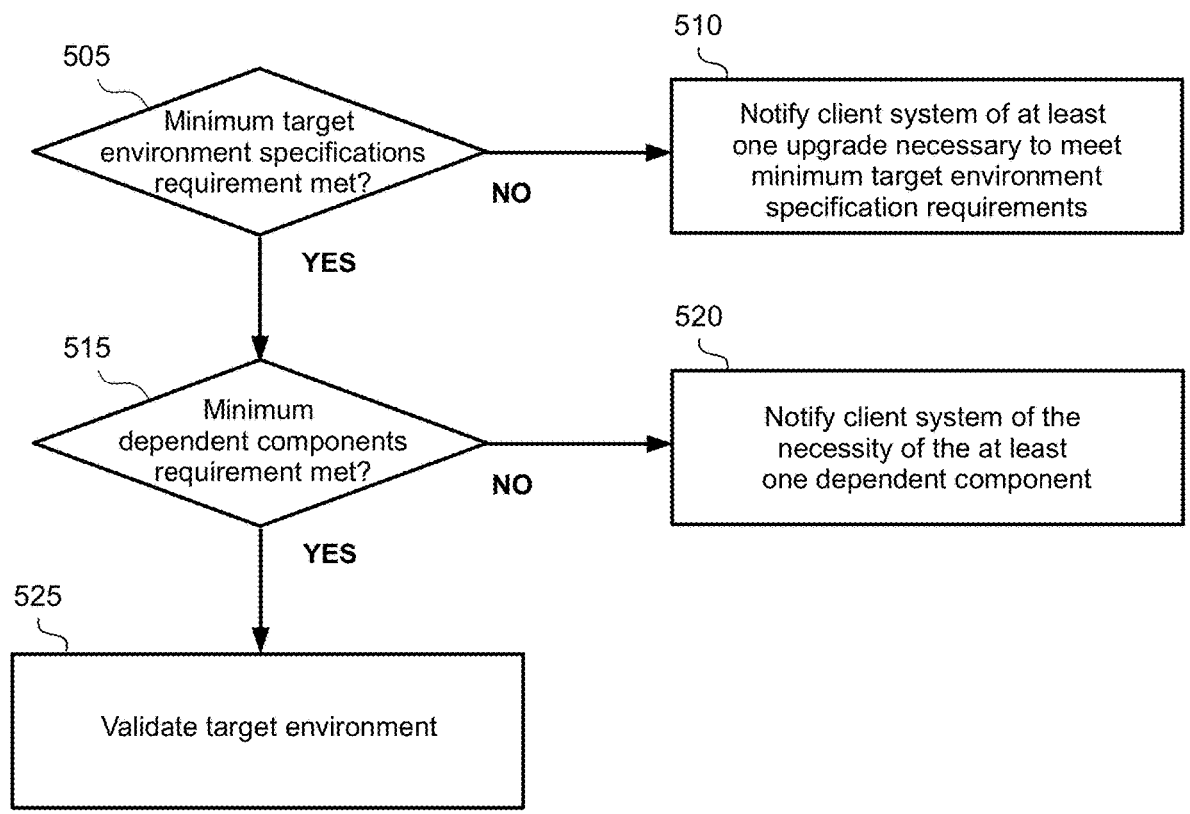
FIG. 5 illustrates a method of validating a target environment, according to one or more embodiments.

FIG. 5 illustrates a method 500 of validating the target environment through inspection. The method 500 provides an example embodiment with respect to step 420 of the method 400. The method 500 begins at step 505, where the cloud server system determines whether specifications of the target environment meet minimum requirements for deployment of the application (e.g., hardware and software requirements). Responsive to determining that specifications of the target environment do not meet minimum requirements for deployment of the application, at step 510 the cloud server system notifies the client system of at least one upgrade necessary to meet the minimum target environment specification requirements for deployment. In an embodiment, the at least one upgrade includes an upgrade to target environment memory. In another embodiment, the at least one update includes an upgrade to disk space. In a further embodiment, the at least one upgrade includes an upgrade to network connectivity. In a further embodiment, the upgrade notification is sent to the interface of the client system for presentation to the client. Responsive to determining that specifications of the target environment meet minimum requirements for deployment of the application, the cloud server system proceeds to step 515.

At step 515, the cloud server system determines whether the target environment meets minimum dependent component requirements for deployment of the application, i.e., whether at least one dependent component required for deployment of the application is present in the target environment. Responsive to determining that at least one dependent component required for deployment of the application is missing from the target environment, at step 520 the cloud server system notifies the client system of the necessity of the at least one dependent component. In an embodiment, dependent components include one or more directory server(s) used for any necessary authentication required by the application. In another embodiment, dependent components include database component(s) or operating system component(s) used by or otherwise associated with the application. In a further embodiment, dependent components include additional product(s)/application(s) necessary for functionality of the application to be deployed. In a further embodiment, the dependent component notification is sent to the interface of the client system for presentation to the client. Responsive to determining that at least one dependent component required for deployment of the application is present in the target environment, at step 525 the cloud server system validates the target environment.

Figure 6:
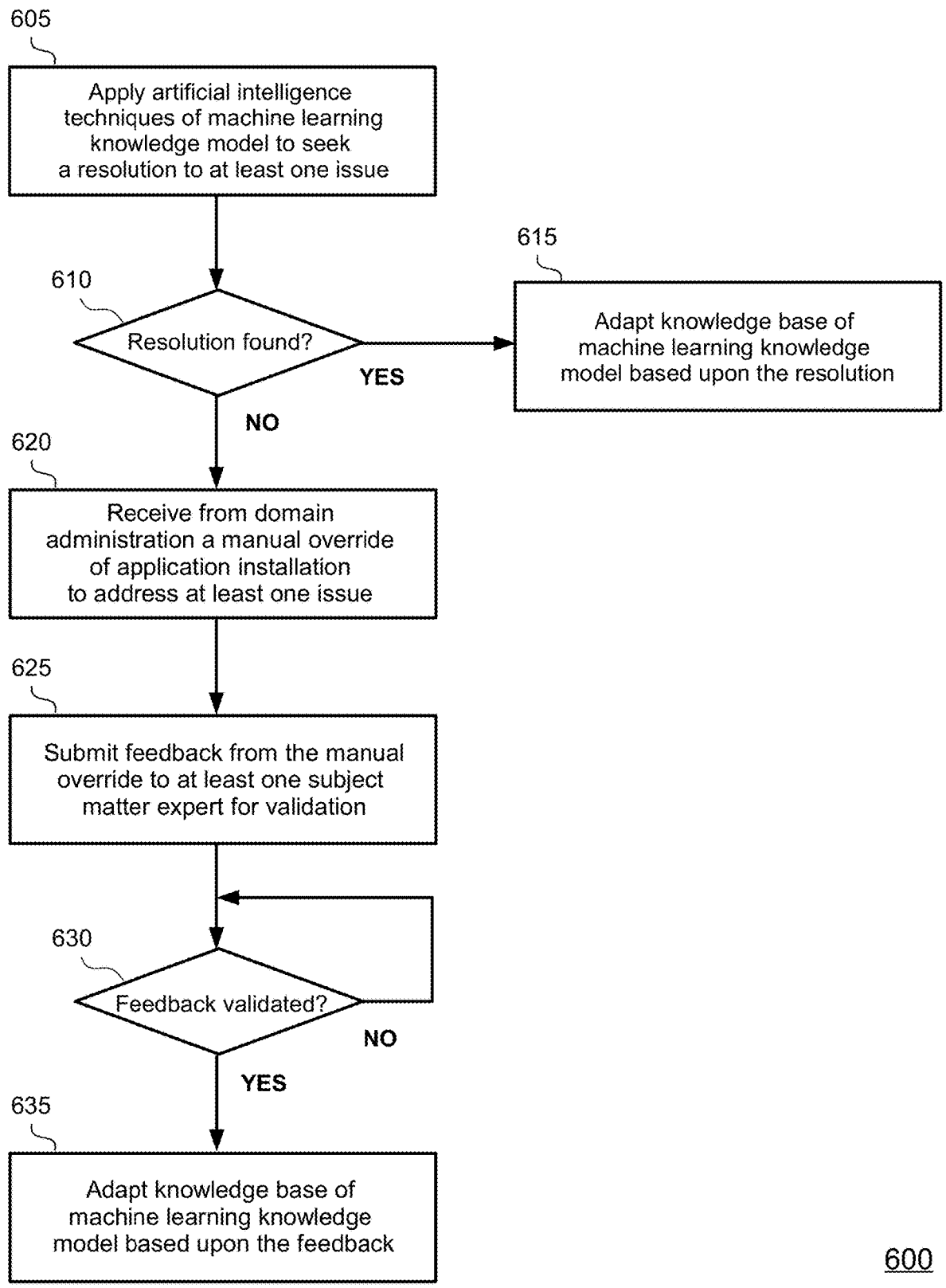
FIG. 6 illustrates a method of addressing at least one issue pertaining to application installation, according to one or more embodiments.

FIG. 6 illustrates a method 600 of addressing at least one issue pertaining to the application installation. The method 600 provides an example embodiment with respect to step 450 of the method 400. The method 600 begins at step 605, where the cloud server system applies artificial intelligence techniques of the machine learning knowledge model to seek a resolution to the at least one issue, e.g., heuristics and/or artificial intelligence algorithms. At step 610, the cloud server system determines whether a resolution to the at least one issue is determined through application of the artificial intelligence techniques. Responsive to determining a resolution to the at least one issue through application of the artificial intelligence techniques, at step 615 the cloud server system adapts the knowledge base of the machine learning knowledge model based upon the determined resolution. Responsive to failing to determine a resolution to the at least one issue through application of the artificial intelligence techniques, the cloud server system proceeds to step 620.

At step 620, the cloud server system receives from domain administration a manual override of the application installation to address the at least one issue. Depending on the application deployment circumstances, the cloud server system may receive a manual override according to step 620 during application installation and/or after application installation. Specifically, in an embodiment, one or more administrators of the managed services domain may monitor the deployment of the application for one or more unknown issues and may issue a manual override to resolve and/or otherwise address any encountered issue. For instance, the domain administration may submit the manual override responsive to the failure to determine a resolution through the artificial intelligence techniques. In an alternative embodiment, responsive to the failure to determine a resolution through the artificial intelligence techniques, the cloud server system may notify the domain administration, which in turn may issue a manual override in accordance with step 620. The manual override includes feedback. In an embodiment, the feedback includes input with regard to one or more aspects of the application installation. In another embodiment, the feedback includes a description of one or more encountered issues as well as steps and/or a plan devised by the domain administration to resolve and/or otherwise address the encountered issue(s). In a further embodiment, the plan includes defined step(s) and/or recommended alternative(s) to address the encountered issue(s).

At step 625, the cloud server system submits the feedback from the manual override to at least one subject matter expert among a plurality of subject matter experts in the managed services domain for validation. In an embodiment, the cloud server system submits the feedback directly to subject matter experts(s) and/or otherwise communicates with subject matter expert(s), e.g., via a form of electronic bulletin board or discussion forum. At step 630, the cloud server system determines whether the feedback is validated by the at least one subject matter expert. Responsive to determining that the feedback has not been validated by the at least one subject matter expert, the cloud server system may repeat step 630 as necessary (e.g., at periodic intervals). Responsive to determining that the feedback has been validated by the at least one subject matter expert, e.g., upon receiving validation of the feedback from the at least one subject matter expert, at step 635 the cloud server system adapts the knowledge base of the machine learning knowledge model based upon the feedback. For example, the cloud server system adapts the knowledge base by adding new categories or by enhancing existing categories. If necessary, the cloud server system facilitates an update to the machine learning knowledge model based upon the adaptation of the knowledge base. In an embodiment, the cloud server system provides the feedback to the machine learning knowledge model, which in turn applies one or more artificial intelligence techniques (e.g., heuristics, artificial intelligence algorithms, etc.) to improve automated deployment capabilities. Accordingly, the cloud server system adapts (or is capable of adapting) the machine learning knowledge model based upon activities performed during each application deployment iteration.

Figure 7:
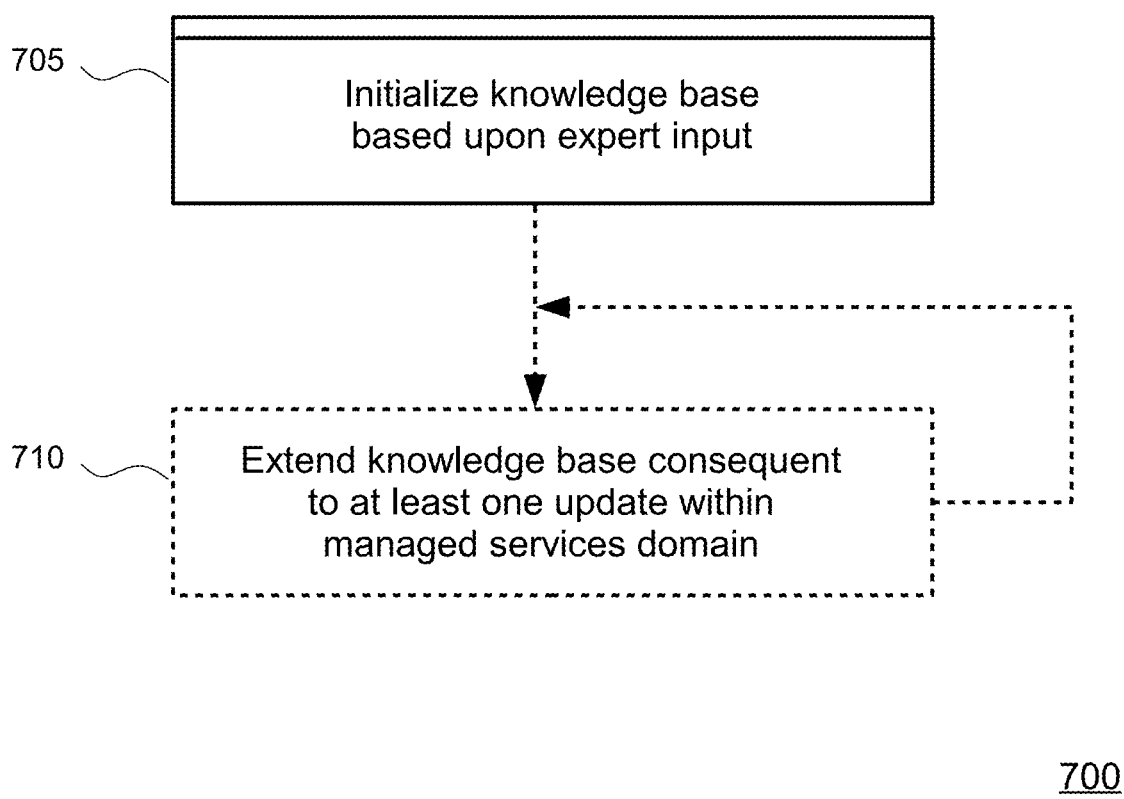
FIG. 7 illustrates a method of configuring a knowledge base of a machine learning knowledge model, according to one or more embodiments.

FIG. 7 illustrates a method 700 of configuring the knowledge base of the machine learning knowledge model. In an embodiment, the method 700 begins at step 705, where the cloud server system initializes the knowledge base of the machine learning knowledge model based upon expert input. For example, the expert input or aspects thereof are provided by at least one subject matter expert among the plurality of subject matter experts in the managed services domain. Additionally or alternatively, the expert input or aspects thereof are provided via reference materials, such as electronic publications. According to such embodiment, the expert input provided at step 705 includes product details, supported environment details, application dependency information, standard deployment architecture information, and/or server configuration parameters for various applications available in the managed services domain. An embodiment with regard to initializing the knowledge base according to step 705 is described with respect to FIG. 8.

Optionally, at step 710 the cloud server system extends the knowledge base consequent to at least one update within the managed services domain. In an embodiment, the at least one update is a system upgrade. Such system upgrade may entail hardware upgrade(s) and/or software update(s). Such system upgrade further may entail upgrade of a single system or multiple systems within the managed services domain. In another embodiment, the at least one update is an application integration. In a further embodiment, the at least one update is an application fix. The cloud server system may apply at least one update upon receipt, or alternatively the cloud server system may apply the at least one update periodically and/or at one or more scheduled intervals. While initialization of the knowledge base according to step 705 occurs once, the cloud server system may extend the knowledge based according to step 710 consequent to receipt of any update(s). In a further embodiment, the cloud server system repeats step 710 responsive to receipt of multiple successive updates.

Figure 8:
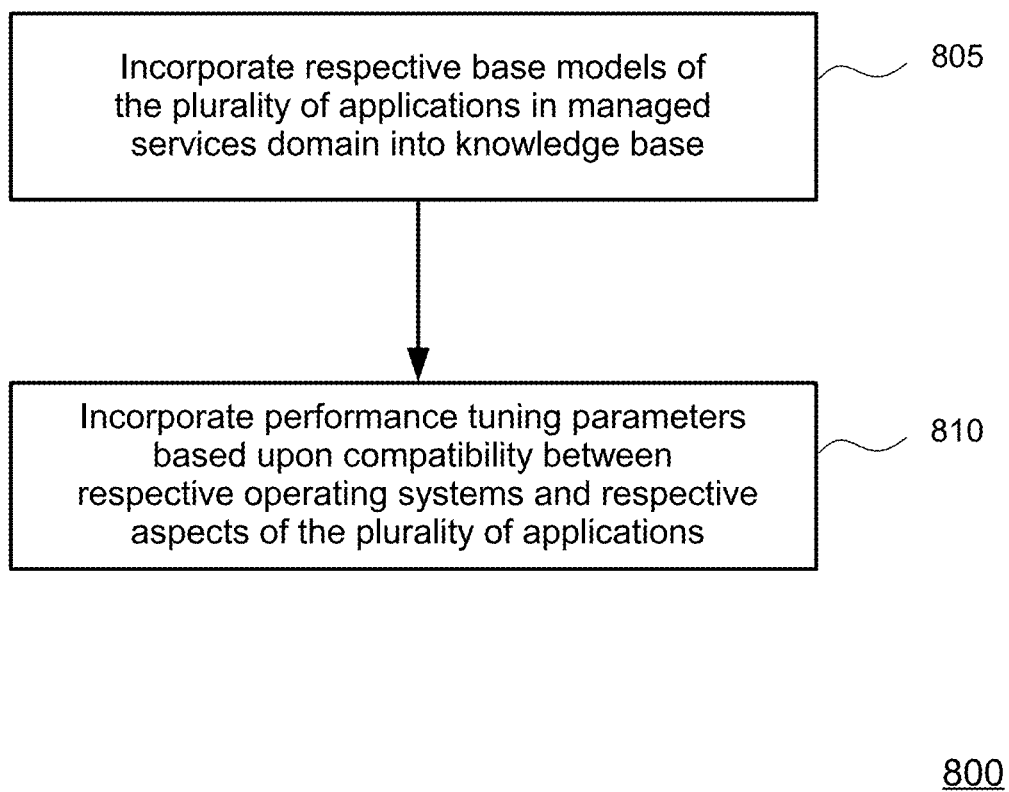
FIG. 8 illustrates a method of initializing a knowledge base of a machine learning knowledge model, according to one or more embodiments.

FIG. 8 illustrates a method 800 of initializing the knowledge base of the machine learning knowledge model. The method 800 provides an example embodiment with respect to step 705 of the method 700. The method 800 begins at step 805, where the cloud server system incorporates respective base models of the plurality of applications in the managed services domain into the knowledge base of the machine learning knowledge model. In the context of the various embodiments described herein, a base model of an application among the plurality of applications includes a listing of respective application versions with available dependencies for the respective versions, any open issue(s) with the respective versions, and/or deployment architectures for the respective versions. At step 810, the cloud server system incorporates performance tuning parameters based upon compatibility between respective operating systems and respective aspects of the plurality of applications. Examples of performance tuning parameters include recommended virtual machine parameters (e.g., Java virtual machine parameters) for a selected application workload, a number of threads for a selected application workload, operating system registry settings, environment settings, and/or suggested disk configuration (e.g., Redundant Array of Independent Disks (RAID) 1).

FIGS. 9A and 9B illustrate an interface of a client system in an example scenario involving presentation of an application deployment plan in the context of steps 430-440 of the method 400. According to the example scenario, which involves client-requested deployment of an Application XYZ, a client system interface 900 includes an application deployment plan 910 presented by the cloud server system in accordance with step 430. The cloud server system may facilitate presentation of client system interface 900 within a client application on a client computing system. As shown in FIG. 9A, application deployment plan 910 includes plan elements $920_1$ to $920_n$. Plan elements $920_1$ to $920_n$ respectively include options $925_1$ to $925_n$ to display plan element details within the client system interface 900. Form response interface element 930 includes client-selectable alternative elements 932 and 934 that respectively permit a client to indicate approval or disapproval of application deployment plan 910 in accordance with step 435. Specifically, affirmative client-selectable alternative element 932 permits a client to indicate approval of application deployment plan 910, while negative client-selectable alternative element 934 permits a client to indicate disapproval of application deployment plan 910. As shown in FIG. 9B, upon client selection of negative client-selectable alternative element 934, the cloud server system facilitates presentation of a text box element 940 in client system interface 900, which may enable client entry of at least one proposed alternative to application deployment plan 910 in accordance with step 440.

FIG. 10 depicts an interface of a client system in an example scenario involving display of progress indictors with respect to application installation during application deployment in accordance with step 445. A client system interface 1000 includes application deployment control panel 1010 illustrating metrics with respect to client-requested deployment of Application XYZ. Application deployment control panel 1010 includes information regarding the installation progress of respective application components $1020_1$ to $1020_n$. Such information includes respective progress indicators $1025_1$ to $1025_n$, which depict percentage installation progress of respective application components $1020_1$ to $1020_n$ as required for the deployment of Application XYZ. Furthermore, application deployment control panel 1010 includes overall application deployment progress indicator 1030, which depicts percentage progress with respect to the overall deployment of Application XYZ.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of automated deployment of an application among a plurality of applications in a managed services domain, the method comprising:
    receiving from a client system a deployment request with respect to a target environment;
    analyzing the deployment request via a machine learning knowledge model, wherein the machine learning knowledge model determines, based upon application configuration details included in the deployment request, installation prerequisites or dependent components by employing one or more heuristics having predetermined input that includes installation prerequisites or dependent components of a most recently encountered deployment request;
    requesting from the client system access to the target environment;
    upon receiving access to the target environment, validating the target environment through inspection;
    upon validating the target environment, facilitating presentation of an application deployment plan through an interface of the client system; and
    responsive to client approval of the application deployment plan, deploying the application by facilitating application installation in the target environment via the machine learning knowledge model.

2. The method of claim 1, further comprising:
    addressing at least one issue pertaining to the application installation.

3. The method of claim 2, wherein addressing the at least one issue pertaining to the application installation comprises:
    applying artificial intelligence techniques of the machine learning knowledge model to seek a resolution to the at least one issue; and
    responsive to failing to determine a resolution to the at least one issue through application of the artificial intelligence techniques, receiving from domain administration a manual override of the application installation to address the at least one issue, wherein the manual override includes feedback.

4. The method of claim 3, wherein addressing the at least one issue pertaining to the application installation further comprises:
    submitting the feedback to at least one subject matter expert among a plurality of subject matter experts in the managed services domain for validation; and
    upon receiving validation of the feedback, adapting a knowledge base of the machine learning knowledge model based upon the feedback.

5. The method of claim 1, wherein validating the target environment comprises:
    responsive to determining that specifications of the target environment do not meet minimum requirements for deployment of the application, notifying the client system of at least one upgrade necessary to meet the minimum requirements.

6. The method of claim 5, wherein validating the target environment further comprises:
    responsive to determining that at least one dependent component required for deployment of the application is missing from the target environment, notifying the client system of the necessity of the at least one dependent component.

7. The method of claim 1, further comprising:
    responsive to client disapproval of the application deployment plan, receiving from the client system at least one proposed alternative.

8. The method of claim 1, wherein configuring a knowledge base of the machine learning knowledge model comprises:
    initializing the knowledge base based upon expert input.

9. The method of claim 8, wherein initializing the knowledge base comprises:
    incorporating respective base models of the plurality of applications into the knowledge base; and
    incorporating performance tuning parameters based upon compatibility between respective operating systems and respective aspects of the plurality of applications.

10. The method of claim 8, wherein configuring the knowledge base further comprises:
    extending the knowledge base consequent to at least one update within the managed services domain selected from the group consisting of a system upgrade, an application integration, and an application fix.

11. The method of claim 1, wherein deploying the application comprises employing one or more heuristics to handle a newly encountered issue by selecting a deployment action based upon a deployment action taken in connection with a most recently encountered issue.

12. The method of claim 1, wherein deploying the application comprises employing one or more heuristics to handle a newly encountered issue by selecting a deployment action based upon a deployment action taken in connection with a previously encountered issue having a highest degree of similarity to the newly encountered issue.

13. A computer program product comprising a computer readable storage medium having program instructions embodied therewith for automated deployment of an application among a plurality of applications in a managed services domain, the program instructions executable by a computing device to cause the computing device to:

receive from a client system a deployment request with respect to a target environment;

analyze the deployment request via a machine learning knowledge model, wherein the machine learning knowledge model determines, based upon application configuration details included in the deployment request, installation prerequisites or dependent components by employing one or more heuristics having predetermined input that includes installation prerequisites or dependent components of a most recently encountered deployment request;

request from the client system access to the target environment;

upon receiving access to the target environment, validate the target environment through inspection;

upon validating the target environment, facilitate presentation of an application deployment plan through an interface of the client system; and responsive to client approval of the application deployment plan, deploy the application by facilitating application installation in the target environment via the machine learning knowledge model.

14. The computer program product of claim 13, wherein the product instructions further cause the computing device to:

address at least one issue pertaining to the application installation.

15. The computer program product of claim 14, wherein addressing the at least one issue pertaining to the application installation comprises:

applying artificial intelligence techniques of the machine learning knowledge model to seek a resolution to the at least one issue; and responsive to failing to determine a resolution to the at least one issue through application of the artificial intelligence techniques, receiving from domain administration a manual override of the application installation to address the at least one issue, wherein the manual override includes feedback.

16. The computer program product of claim 15, wherein addressing the at least one issue pertaining to the application installation further comprises:

submitting the feedback to at least one subject matter expert among a plurality of subject matter experts in the managed services domain for validation; and upon receiving validation of the feedback, adapting a knowledge base of the machine learning knowledge model based upon the feedback.

17. A system comprising:

a processor; and a memory storing an application program, which, when executed on the processor, performs an operation of automated deployment of an application among a plurality of applications in a managed services domain, the operation comprising:

receiving from a client system a deployment request with respect to a target environment;

analyzing the deployment request via a machine learning knowledge model, wherein the machine learning knowledge model determines, based upon application configuration details included in the deployment request, installation prerequisites or dependent components by employing one or more heuristics having predetermined input that includes installation prerequisites or dependent components of a most recently encountered deployment request;

requesting from the client system access to the target environment;

upon receiving access to the target environment, validating the target environment through inspection;

upon validating the target environment, facilitating presentation of an application deployment plan through an interface of the client system; and responsive to client approval of the application deployment plan, deploying the application by facilitating application installation in the target environment via the machine learning knowledge model.

18. The system of claim 17, wherein the operation further comprises:

addressing at least one issue pertaining to the application installation.

19. The system of claim 18, wherein addressing the at least one issue pertaining to the application installation comprises:

applying artificial intelligence techniques of the machine learning knowledge model to seek a resolution to the at least one issue; and responsive to failing to determine a resolution to the at least one issue through application of the artificial intelligence techniques, receiving from domain administration a manual override of the application installation to address the at least one issue, wherein the manual override includes feedback.

20. The system of claim 19, wherein addressing the at least one issue pertaining to the application installation further comprises:

submitting the feedback to at least one subject matter expert among a plurality of subject matter experts in the managed services domain for validation; and upon receiving validation of the feedback, adapting a knowledge base of the machine learning knowledge model based upon the feedback.

* * * * *